United States Patent Office
2,894,936
Patented July 14, 1959

2,894,936

REACTION PRODUCTS OF 1,2,4-TRIMETHYLENE-CYCLOHEXANE WITH ALPHA,BETA-ETHYLENICALLY UNSATURATED COMPOUNDS, THEIR PREPARATION AND HOMOPOLYMERS THEREOF

Richard E. Benson, Claymont, Del., assignor to E. I. du Pont de Nemours and Company, Wilmington, Del., a corporation of Delaware No Drawing. Application October 22, 1956
Serial No. 617,236

23 Claims. (Cl. 260—78.4)

This invention relates to new compositions of matter and to methods for their preparation. More particularly this invention relates to new unsaturated polycyclic compounds, to their preparation, and to their polymerization products.

The new unsaturated cyclic compound 1,2,4-trimethylenecyclohexane,

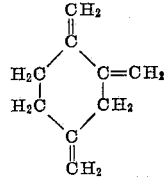

is described and claimed in my patent application Ser. No. 615,015, filed on October 10, 1956, now Patent No. 2,839,510, issued June 17, 1958. This compound is prepared by heating, at a temperature in the range of 70–130° C., allene in the presence of a catalytic amount of a complex of nickel carbonyl with an organic phosphine or phosphite, this complex having the formula

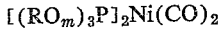

where $m$ is a cardinal number from 0 to 1 and R is a hydrocarbon radical free from aliphatic unsaturation. 1,2,4-trimethylenecyclohexane is normally obtained by this process as a mixture with its isomer, 1,3,5-trimethylenecyclohexane. In this mixture, the 1,2,4 isomer predominates, being present in the amount of about 80%.

It is an object of this invention to provide new compositions of matter and methods for their preparation. A further object is to provide new unsaturated polycyclic compounds and polymers thereof. Other objects will appear hereinafter.

These and other objects of this invention are accomplished by providing new 6-methylene-1,2,3,4,5,6,7,8-octahydronaphthalenes which are the adducts of 1,2,4-trimethylenecyclohexane with a dienophilic alpha,beta-unsaturated compound. It has now been found that 1,2,4-trimethylenecyclohexane reacts with dienophilic alpha,beta-unsaturated compounds to give addition products which retain one methylene group and are capable of polymerizing.

The new products of this invention are 6-methylene-1,2,3,4,5,6,7,8-octahydronaphthalenes having on at least one of the carbon atoms in the 2- and 3-positions at least one substituent which is an unsaturated group having a multiple bond attached to an atom alpha to the ring carbon, any other substituents on the carbon atoms in the 2- and 3-positions being hydrocarbon. These products can be represented by the formula

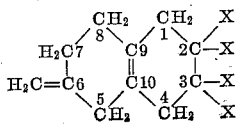

in which at least one X is an unsaturated group having a multiple bond attached to an atom alpha to the ring carbon, any other X substituent which replaces a hydrogen atom being hydrocarbon. These groups having a multiple bond attached to an atom alpha to the ring carbon are the electron attracting groups of the alpha,beta-unsaturated compounds normally used as dienophilics in the Diels-Alder reaction. Examples of these unsaturated groups are cyano, —CN; nitro, —NO₂; aldehydic carbonyl, —CHO; ketonic carbonyl, —COR; carboxyl, —COOH; ester carbonyl, —COOR; dicarbonyl anhydride, —CO—O—CO—; carbonamido, —CONH₂; acyl chloride, —COCl; sulfone sulfonyl, —SO₂R; phenyl, —C₆H₅; vinyl, —CH=CH₂, where R is hydrocarbon free from aliphatic unsaturation, such as alkyl and aryl, and usually of not more than 6 carbon atoms. In the preferred compounds at least one X substituent is the carboxyl group or a group hydrolyzable thereto, preferably of not more than 7 carbon atoms, such as the cyano, carbalkoxy, carbonamido, acid anhydride or acid chloride groups, the other X's being hydrogen or hydrocarbon free from aliphatic unsaturation and preferably having from 1 to 6 carbon atoms. This invention also includes the polymers of these products.

The above-defined 6-methylene-1,2,3,4,5,6,7,8-octahydronaphthalenes are prepared by the well known Diels-Alder reaction. The reactants are, on the one hand, 1,2,4-trimethylenecyclohexane, which acts as the diene and can be used preformed, or can be made in situ, as more fully explained later, and, on the other hand, a dienophilic ethylenic compound which is alpha,beta-unsaturated with respect to the carbon-to-carbon double bond, i.e., a conjugated unsaturate. It is known that such alpha,beta-unsaturates, in which the ethylenic double bond is activated by another unsaturated group conjugated therewith, are powerful dienophiles. In these conjugated alpha,beta-unsaturates the ethylenic double bond and the multiple bond of the activating group are attached to atoms alpha,beta to each other. Many such compounds are listed in the article entitled "The Diels-Alder Reaction" by H. L. Holmes in "Organic Reactions," vol. IV, 60–173 (John Wiley and Sons, Inc., 1948).

Examples of these conjugated alpha,beta-unsaturates are conjugated diolefins, alpha,beta-unsaturated carbonyl compounds, such as alpha,beta-unsaturated aldehydes, alpha,beta-unsaturated ketones, alpha,beta-unsaturated acids, alpha,beta-unsaturated esters and alpha,beta-unsaturated anhydrides and ethylenic compounds in which the ethylenic double bond is alpha,beta to a nitrile or nitro group, that is alpha,beta-unsaturated nitriles and alpha,beta-unsaturated nitro compounds. Usually the alpha,beta-unsaturated compounds contain not more than 9 carbon atoms and generally a terminal methylene group. The preferred alpha,beta-unsaturates suitable for preparing the products of this invention can be represented by the formula

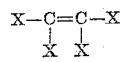

wherein at least one X is an unsaturated group having a multiple bond alpha to the doubly bonded carbon atom to which it is attached and the other X's are hydrogen or hydrocarbon groups. Examples of suitable unsaturated groups are —CN, —NO₂, —CHO, —COOH, —COOR, —CO—O—CO—, —CONH₂, —COCl, —COR, —SO₂R, —C₆H₅ or —CH=CH₂, where R is hydrocarbon free from aliphatic unsaturation, such as alkyl or aryl, and usually of not more than 6 carbon atoms. In general, it is preferred to use an alpha,beta-unsaturate which is wholly aliphatic, i.e., free from aromatic groups.

Among the most reactive alpha,beta-unsaturates are those dienophiles wherein the unsaturated group is the carboxyl group or a group hydrolyzable thereto, i.e., a cyano, carbalkoxy, carbonamido, acid anhydride, or acid chloride group. The preferred dienophiles for use in this invention are therefore those as above defined in which one X is the carboxyl group or a group hydrolyzable thereto, usually of not more than 7 carbon atoms, such as the cyano, carbalkoxy, carbonamido, acid anhydride or acid chloride groups, the other X's being hydrogen or hydrocarbon free from aliphatic unsaturation and preferably having from 1 to 6 carbon atoms.

The products of this invention can be prepared by reacting an alpha,beta-unsaturate with preformed 1,2,4-trimethylenecyclohexane, a liquid boiling at 67.5–69° C. at 60 mm. pressure. In this reaction, the already mentioned isomeric mixture of 1,2,4- and 1,3,5-trimethylenecyclohexane, containing about 80% of the former, is used directly. The 1,3,5-isomer does not participate in the reaction. A more direct, and preferred, method consists in heating allene and the alpha,beta-unsaturate in the presence, as the catalyst, of a complex of nickel carbonyl with an organic phosphine or phosphite, this complex having the formula $[(RO_m)_3P]_2Ni(CO)_2$, where $m$ is a cardinal number from 0 to 1 and R is a hydrocarbon radical free from aliphatic unsaturation and usually of not more than 7 carbon atoms. These are the catalysts suitable for the preparation of 1,2,4-trimethylenecyclohexane, as described in my patent application, Ser. No. 615,015, filed October 10, 1956, now Patent No. 2,839,510, issued June 17, 1958, already referred to. In this second method, it is believed that allene is first converted in situ to 1,2,4-trimethylenecyclohexane, the latter then reacting with the alpha,beta-unsaturate to give the Diels-Alder adduct in one operation. Both methods are illustrated in the examples which follow.

It will be seen that, unless the alpha,beta-unsaturate is symmetrical with respect to the double bond (e.g., tetracyanoethylene), the reaction product can be obtained in isomeric forms, in which the activating unsaturated substituents are attached to carbon atoms in either the 2- or 3-positions of the octahydronaphthalene structure.

The reaction conditions in either of the above-mentioned preparative methods are not critical. When preformed 1,2,4-trimethylenecyclohexane is reacted with the alpha,beta-unsaturate, the reaction is desirably carried out at a temperature from about 10 to about 175° C., preferably in the range of 50–150° C., and preferably in the presence of a small amount of polymerization inhibitor, such as phenothiazine, hydroquinone, resorcinol and the like, to prevent excessive polymerization of the reactants or reaction product. The alpha,beta-unsaturate is preferably, but not necessarily, used in excess over the amount required for complete reaction with the trimethylenecyclohexane. An inert solvent can be used if desired, such as tetrahydrofuran, benzene, toluene, dioxane and the like. The reaction product (Diels-Alder adduct) is isolated by the usual methods of distillation or crystallization.

In the method whereby the Diels-Alder adduct is prepared in one step from allene, the alpha,beta-unsaturate and a catalyst as heretofore defined, the reaction temperature can be about 10 to about 175° C. A convenient temperature range is that between 50 and 150° C., the optimum temperature depending in part on the reactivity of the alpha,beta-unsaturate. The latter is desirably, though not necessarily, used in excess over the calculated amount, and a small amount of a polymerization inhibitor may be used. If desired, an inert solvent can be used. All ingredients should be anhydrous, or substantially so.

The catalysts specifically effective for this reaction employing allene and the alpha,beta-unsaturate are the complexes of nickel carbonyl with phosphines, $R_3P$, or phosphites, $(RO)_3P$, where R is a hydrocarbon radical free from aliphatic unsaturation, e.g., an alkyl, aryl, aralkyl or cycloalkyl radical. The nickel carbonyl/phosphine complexes have the general formula $(R_3P)_2Ni(CO)_2$. These compounds are described in the literature, for example by Reppe et al. in Ann. 560, 104 (1948). The nickel carbonyl/phosphite complexes have the general formua $[(RO)_3P]_2Ni(CO)_2$, and they also are described in the literature (Reed, J. Chem. Soc., 1954, 1940). This class of catalysts is represented by the generic formula $[(RO_m)_3P]_2Ni(CO)_2$, where $m$ is 0 or 1 and R is a hydrocarbon radical free from aliphatic unsaturation usually of not more than 7 carbon atoms. The most stable of these complexes are those having the formula just given, which are prepared by the combination, with evolution of two moles of carbon monoxide, of two moles of the phosphine or phosphite with one mole of nickel carbonyl. However, less well-defined complexes can be prepared by reacting more or less than two moles of phosphine or phosphite with one mole of nickel carbonyl. The resulting products, containing complexes which may be represented by the formula $[(RO_m)_3P]_nNi(CO)_{4-n}$, where $n$ is 1, 2 or 3, $m$ is 0 or 1, and R is a hydrocarbon radical free from aliphatic unsaturation, usually of not more than 7 carbon atoms, are also effective as catalysts in the process of this invention.

Illustrative catalysts suitable for use in the process of this invention are bis(triphenyl phosphite)nickel dicarbonyl, bis(tritolyl phosphite)nickel dicarbonyl, bis(trimethyl phosphite)nickel dicarbonyl, bis(tribenzyl phosphite)nickel dicarbonyl, bis(tricyclohexyl phosphite)nickel dicarbonyl, bis(tributyl phosphine)nickel dicarbonyl, bis(triphenyl phosphine)nickel dicarbonyl, and the like. The bis(triaryl phosphite)nickel dicarbonyls are in general preferred. The catalyst need be used only in very small amounts, e.g., in amounts such that there is present from about 0.001 to 0.05 gram-atom of nickel per mole of allene. Higher amounts can be used but it is unnecessary to do so.

The substituted 6-methylene-1,2,3,4,5,6,7,8-octahydronaphthalenes of this invention are in general high boiling liquids or crystalline solids. They possess a tendency to polymerize spontaneously. These products polymerize on mere exposure to air in thin layers for a few hours, and the initially tacky polymeric films air-dry on continued exposure to become tack-free and less sensitive to solvents in which the polymer was initially soluble.

The following examples illustrate the invention:

*Example 1*

A stainless steel pressure vessel was charged with 185 ml. of stabilized methyl methacrylate, 5 g. of bis(triphenyl phosphite)nickel dicarbonyl,

0.5 g. of phenothiazine to serve as added stabilizer and 40 g. of allene. The vessel was heated at 100–105° C. for 6 hours, during which the internal pressure fell from 120 to 3 lb./sq.in. Distillation of the crude reaction product gave 121 g. of unreacted methyl methacrylate, 43 g. of a colorless oil boiling at 100–130° C. at 0.5 mm. pressure and 23 g. of a viscous residue. Redistillation of the colorless oil through a small spinning band column yielded 33 g. of product boiling at 90° C. at 1 mm. pressure, $n_D^{25}$ 1.5012–1.5018. This was 2(3)-methyl - 2(3) - carbomethoxy - 6 - methylene - 1,2,3,4,5,6,7,8-octahydronaphthalene which is represented by the following structural formula wherein both the methyl and carbomethoxy groups are attached to one of the carbon atoms in the 2- or 3-positions of the octahydronaphthalene nucleus.

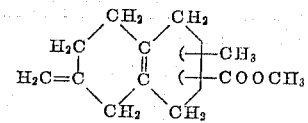

This product was obtained in 45% conversion, based on the allene charged.

*Analysis.*—Calc'd for $C_{14}H_{20}O_2$: C, 76.32; H, 9.15;

M.W., 220; saponification No., 254. Found: C, 77.08; H, 9.42; M.W., 215; saponification No., 255.

The structure of the compound was confirmed by its infrared spectrum which showed absorption for the methylene group, the ester carbonyl and the methyl group.

*Example II*

A stainless steel pressure vessel was charged with 125 ml. of stabilized methyl acrylate, 5 g. of bis(triphenyl phosphite)nickel dicarbonyl and 40 g. of allene, and heated at 145–155° C. for 4 hours. Preliminary distillation of the reaction product gave 55.8 g. of a colorless oil, B.P. 100–148° C. at 1.2 mm., and 40.3 g. of viscous residue. The distillate was combined with that (78.5 g.) of a similar preparation from 70 g. of allene and redistilled. The fraction (22.3 g.) boiling at 77.5° C. at 0.07 mm., $n_D^{25}$ 1.4989–1.5008, was 2(3)-carbomethoxy-6-methylene-1,2,3,4,5,6,7,8-octahydronaphthalene which is represented by the following structural formula:

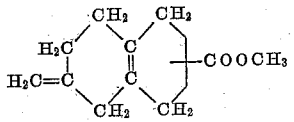

*Analysis.*—Calc'd for $C_{13}H_{18}O_2$: C, 75.69; H, 8.79. Found: C, 73.62; H, 8.90.

The structure was confirmed by infrared and Raman spectral analysis.

*Example III*

A mixture of 125 g. of stabilized acrylonitrile, 5 g. of bis(triphenyl phosphite)nickel dicarbonyl, 1 g. of phenothiazine, 50 g. of allene and 150 ml. of tetrahydrofuran was heated at 80–85° C. in a pressure vessel for 6 hours. The solvent was removed from the reaction product by distillation and the residue was fractionated. There was obtained 8.4 g. of product boiling at 90° C. at 0.3 mm., $n_D^{25}$ 1.5198, which infrared and compositional analysis showed to be 2(3)-cyano-6-methylene-1,2,3,4,5,6,7,8-octahydronaphthalene and which is represented by the following structural formula:

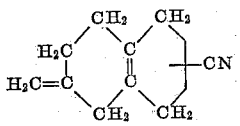

*Analysis.*—Calc'd for $C_{12}H_{15}N$: C, 83.24; H, 8.67; N, 8.09. Found: C, 82.85; H, 9.12; N, 8.64.

*Example IV*

A mixture of 100 g. of allene, 80 g. of 1,3-butadiene, 5 g. of bis(triphenyl phosphite)nickel dicarbonyl, 200 ml. of dry tetrahydrofuran and 10 g. of calcium carbide (to absorb any moisture present) was heated in a pressure vessel at 115–140° C. for 7 hours. The reaction product was given a preliminary distillation to remove solvent and non-volatile material, and the distillate was refractionated. The product boiling at 123–123.5° C. at 23 mm., $n_D^{25}$ 1.5162, was 2(3)-vinyl-6-methylene-1,2,3,4,5,6,7,8-octahydronaphthalene which is represented by the following structural formula:

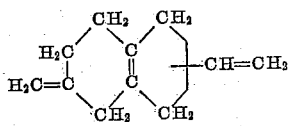

*Analysis.*—Calc'd for $C_{13}H_{18}$: C, 89.65; H, 10.35. Found: C, 90.05; H, 10.45.

The structure was confirmed by the infrared spectrum which showed the presence of a methylene group and a vinyl group.

*Example V*

A mixture of 80 g. of allene, 98 g. of maleic anhydride, 5 g. of bis(triphenyl phosphite)nickel dicarbonyl, 1 g. of phenothiazine and 200 ml. of tetrahydrofuran was heated at 80–88° C. for 6 hours. The reaction product was a solid material which could not be induced to crystallize. Analysis showed that this product, which had a molecular weight of 1530, was the polymerized anhydride of 6-methylene - 1,2,3,4,5,6,7,8 - octahydronaphthalene - 2,3-dicarboxylic acid, which monomer is represented by the following structural formula:

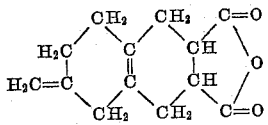

*Analysis.*—Calc'd for $(C_{13}H_{14}O_3)_x$: C, 71.56; H, 6.43. Found: C, 71.11; H, 6.87.

The corresponding monomer was prepared by reacting, under milder conditions, the preformed 1,2,4-trimethylenecyclohexane with maleic anhydride, as described in the following example.

*Example VI*

To a solution of 3 g. of maleic anhydride in 100 ml. of benzene was added 3 g. of the isomer mixture containing 1,2,4- and 1,3,5-trimethylenecyclohexanes in about 80:20 ratio. The reaction mixture became immediately quite warm. After addition of 0.2 g. of phenothiazine, the mixture was allowed to stand in a nitrogen atmosphere for about 16 hours at room temperature of about 20° C. It was then filtered to separate a small amount of insoluble material, and the filtrate was concentrated at 50° C. under reduced pressure. Upon addition of petroleum ether, 6-methylene-1,2,3,4,5,6,7,8-octahydronaphthalene-2,3-dicarboxylic anhydride separated as white plates melting at 82–83° C.

*Analysis.*—Calc'd for $C_{13}H_{14}O_3$: C, 71.56; H, 6.43. Found: C, 71.00; H, 6.48.

*Example VII*

A mixture of 1.5 g. of 1,2,4-trimethylenecyclohexane (isomer mixture containing about 80% of the 1,2,4-isomer), 7 ml. of methyl methacrylate and 0.1 g. of phenothiazine was sealed under nitrogen and heated at 100° C. for about 16 hours. The reaction product was a colorless liquid boiling at 66° C. at 0.07 mm., $n_D^{25}$ 1.5003. This product was identical with the 2(3)-methyl-2(3) - carbomethoxy - 6 - methylene - 1,2,3,4,5,6,7,8-octahydronaphthalene of Example I.

*Example VIII*

About 1 g. of 1,2,4-trimethylenecyclohexane (isomer mixture) was treated with an excess of tetracyanoethylene dissolved in acetone. An exothermic reaction occurred. After it has subsided, petroleum ether was added, which caused the separation of a white crystalline material, M.P. 97.5–98° C. This was 2,2,3,3-tetracyano-6-methylene-1,2,3,4,5,6,7,8-octahydronaphthalene, which is represented by the following structural formula:

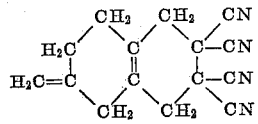

*Analysis.*—Calc'd for $C_{15}H_{12}N_4$: C, 72.58; H, 4.84. Found: C, 72.87; H, 4.82.

*Example IX*

A mixture of 178 g. of stabilized methyl acrylate, 3 g. of bis(triphenyl phosphine)nickel dicarbonyl, $[(C_6H_5)_3P]_2Ni(CO)_2$, 60 g. of allene, 10 g. of pulverized calcium carbide and 0.5 g. of phenothiazine was heated under autogenous pressure at 80° C. for 15 hours. There was obtained 47.5 g. of a colorless oil, B.P. 91–92° C. at 0.12 mm. Infrared spectral analysis indicated that this product was the same as that of Example II, obtained from the same reactants but with a phosphite catalyst.

Example X

A thin layer of the 2(3)-methyl-2(3)-carbomethoxy-6-methylene-1,2,3,4,5,6,7,8-octahydronaphthalene of Example I, containing a cobalt drying agent was exposed on a glass plate to air at room temperature. The liquid solidified progressively and, after a few days, the polymer formed a soft, tack-free film which was partially resistant to organic solvents such as toluene and petroleum ether.

Many other specific compounds are obtained by reacting 1,2,4-trimethylenecyclohexane with other alpha,beta-unsaturates by the procedures described in the examples. These additional compounds include, among others, those listed below together with the alpha,beta-unsaturates from which they are derived. For the sake of brevity, only the groups attached to the 2- and 3-carbon atoms of the 6-methylene-1,2,3,4,5,6,7,8-octahydronaphthalene are named. In each case, it is assumed that the activating unsaturated group of the alpha,beta-unsaturate is attached to the 2-carbon atom. It is understood, however, that the actual compound can be the isomer having the unsaturated group on the 3-carbon, or a mixture of the two isomers.

2-cyano-3-methyl, from crotononitrile
2-nitro-3-phenyl, from beta-nitrostyrene
2-nitro-3-propyl, from 1-nitro-1-pentene
2-formyl, from acrolein
2-formyl-3-methyl, from crotonaldehyde
2-carboxy, from acrylic acid
2-carboxy-3-phenyl, from cinnamic acid
2-carbomethoxy-3-methyl, from methyl crotonate
2-carbomethoxy-2-phenyl, from methyl alpha-phenyl acrylate
2-carboamido-2-methyl, from methacrylamide
2-chlorocarbonyl, from acrylyl chloride
2-acetyl, from methyl vinyl ketone
2,3-diacetyl, from diacetylethylene
2-benzoyl, from phenyl vinyl ketone
2-phenylsulfo, from phenyl vinyl sulfone
2-methyl-2-vinyl, from isoprene
2-phenyl, from styrene The monomeric products polymerize on exposure to air for a sufficient period of time, which depends on the reactivity of the monomer and may be as short as a few hours. On continued air-drying, the polymers set to structures having improved resistance to organic solvents and other chemical agents. These polymers are of value as coating compositions for application to surfaces such as wood or plaster and particularly metals, e.g., autobodies, refrigerators, furniture, etc. The products containing ester or esterifying substituents, e.g., those of Examples I, II and VI, can be reacted with polyhydric alcohols such as glycol or glycerol to give viscous polyesters which can be applied to substrates such as metal and then polymerized thereon by baking to give protective coatings.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A 6-methylene-1,2,3,4,5,6,7,8-octahydronaphthalene having on at least one of the carbon atoms in the 2- and 3-positions at least one substituent which is selected from the class consisting of —CN, —NO$_2$, —CHO, —COR, —COOH, —COOR, —CONH$_2$, —COCl, —SO$_2$R, —C$_6$H$_5$, —CH=CH$_2$, and, together with a substituent on one of the adjacent carbon atoms in the 2- and 3-positions, —CO—O—CO—, R in said substituents being hydrocarbon free from aliphatic unsaturation of 1 to 6 carbon atoms, any other substituents on the carbon atoms in the 2- and 3-positions being hydrocarbon free from aliphatic unsaturation and having from 1 to 6 carbon atoms.

2. A homopolymer of a 6-methylene-1,2,3,4,5,6,7,8-octahydronaphthalene as set forth in claim 1.

3. A 6-methylene-1,2,3,4,5,6,7,8-octahydronaphthalene having one of the nuclear carbon atoms in the 2- and 3-positions directly attached to a vinyl group.

4. A homopolymer of a 6-methylene-1,2,3,4,5,6,7,8-octahydronaphthalene as set forth in claim 3.

5. A 6-methylene-1,2,3,4,5,6,7,8-octahydronaphthalene having at least one of the nuclear carbon atoms in the 2- and 3-positions directly attached to a cyano group.

6. A homopolymer of a 6-methylene-1,2,3,4,5,6,7,8-octahydronaphthalene as set forth in claim 5.

7. A 6-methylene-1,2,3,4,5,6,7,8-octahydronaphthalene having at least one of the nuclear carbon atoms in the 2- and 3-positions directly attached to a carboalkoxy group.

8. A homopolymer of a 6-methylene-1,2,3,4,5,6,7,8-octahydronaphthalene as set forth in claim 7.

9. 6-methylene-1,2,3,4,5,6,7,8-octahydronaphthalene-2,3-dicarboxylic anhydride.

10. A homopolymer of 6-methylene-1,2,3,4,5,6,7,8-octahydronaphthalene-2,3-dicarboxylic anhydride.

11. Process for preparing 6-methylene-1,2,3,4,5,6,7,8-octahydronaphthalenes which comprises reacting, at a temperature within the range of 10 to 175° C., 1,2,4-trimethylenecyclohexane with an alpha,beta-unsaturated compound of the formula

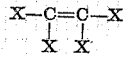

wherein at least one X is an unsaturated group selected from the class consisting of —CN, —NO$_2$, —CHO, —COR, —COOH, —COOR, —CONH$_2$, —COCl, —SO$_2$R, —C$_6$H$_5$, —CH=CH$_2$, and, together with an X on the adjacent carbon atom, —CO—O—CO—, R in said unsaturated groups being hydrocarbon free from an aliphatic unsaturation of 1 to 6 carbon atoms, the remaining X's being selected from the class consisting of hydrogen and hydrocarbon groups free from aliphatic unsaturation of 1 to 6 carbon atoms.

12. Process for preparing 6-methylene-1,2,3,4,5,6,7,8-octahydronaphthalenes as set forth in claim 11 wherein said 1,2,4-trimethylenecyclohexane is formed in situ by reacting, at a temperature of 50 to 150° C., allene and said alpha,beta-unsaturated compound in contact with a catalyst selected from the class consisting of nickel carbonyl/phosphines and nickel carbonyl/phosphites having the general formula

where $n$ is an integer from 1 to 3, $m$ is a cardinal number from 0 to 1, and R is a hydrocarbon radical free from aliphatic unsaturation and of not more than 7 carbon atoms.

13. Process for preparing 6-methylene-1,2,3,4,5,6,7,8-octahydronaphthalenes as set forth in claim 11 wherein said 1,2,4-trimethylenecyclohexane is formed in situ by reacting, at a temperature of 50 to 150° C., allene and said alpha-beta-unsaturated compound in contact with a nickel carbonyl/phosphine catalyst having the formula (R$_3$P)$_2$Ni(CO)$_2$ where R is a hydrocarbon radical free from aliphatic unsaturation and of not more than 7 carbon atoms.

14. Process for preparing 6-methylene-1,2,3,4,5,6,7,8-octahydronaphthalenes as set forth in claim 11 wherein said 1,2,4-trimethylenecyclohexane is formed in situ by reacting, at a temperature of 50 to 150° C., allene and said alpha,beta-unsaturated compound in contact with a nickel carbonyl/phosphite catalyst having the formula $[(RO)_3P]_2Ni(CO)_2$ where R is a hydrocarbon radical free from aliphatic unsaturation and of not more than 7 carbon atoms.

15. Process for preparing 6-methylene-1,2,3,4,5,6,7,8-octahydronaphthalenes which comprises heating and reacting, at a temperature within the range of 50 to 150° C., 1,2,4-trimethylenecyclohexane with a conjugated ethylenically unsaturated aliphatic hydrocarbon compound of not more than 9 carbon atoms.

16. Process for preparing 6-methylene-1,2,3,4,5,6,7,8-octahydronaphthalenes which comprises heating and reacting, at a temperature within the range of 50 to 150° C., 1,2,4-trimethylenecyclohexane with an alpha,beta-ethylenically unsaturated aliphatic carbonyl compound of not more than 9 carbon atoms.

17. Process for preparing 6-methylene-1,2,3,4,5,6,7,8-octahydronaphthalenes which comprises heating and reacting, at a temperature within the range of 50 to 150° C., 1,2,4-trimethylenecyclohexane with an alpha,beta-ethylenically unsaturated aliphatic nitrile of not more than 9 carbon atoms.

18. Process for preparing 6-methylene-1,2,3,4,5,6,7,8-octahydronaphthalenes which comprises heating and reacting, at a temperature within the range of 50 to 150° C., 1,2,4-trimethylenecyclohexane with an alpha,beta-ethylenically unsaturated aliphatic ester of not more than 9 carbon atoms.

19. Process for preparing 6-methylene-1,2,3,4,5,6,7,8-octahydronaphthalenes which comprises heating and reacting, at a temperature within the range of 50 to 150° C., 1,2,4-trimethylenecyclohexane with an alpha,beta-ethylenically unsaturated aliphatic acid anhydride of not more than 9 carbon atoms.

20. The total reaction product obtained by reacting at a temperature within the range of 50 to 150° C., allene with a conjugated ethylenically unsaturated aliphatic hydrocarbon compound of not more than 9 carbon atoms, in contact with a catalyst selected from the class consisting of nickel carbonyl/phosphines and nickel carbonyl/phosphites having the general formula $$[(RO_m)_3P]_nNi(CO)_{4-n}$$

where $n$ is an integer from 1 to 3, $m$ is a cardinal number from 0 to 1, and R is a hydrocarbon radical free from aliphatic unsaturation and of not more than 7 carbon atoms.

21. The total reaction product obtained by reacting, at a temperature within the range of 50 to 150° C., allene with butadiene, in contact with a nickel carbonyl/phosphite catalyst having the formula $$[(RO)_3P]_2Ni(CO)_2$$

where R is a hydrocarbon radical free from aliphatic unsaturation and of not more than 7 carbon atoms.

22. A 6-methylene-1,2,3,4,5,6,7,8-octahydronaphthalene of the general formula

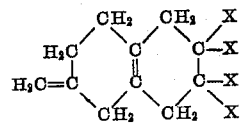

wherein one X is a group of not more than 7 carbon atoms which upon hydrolysis is converted to a carboxyl group directly attached to the ring carbon atom, and the other X's are hydrogen.

23. A 6-methylene-1,2,3,4,5,6,7,8-octahydronaphthalene of the general formula

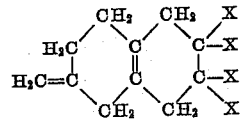

wherein one X is a group of not more than 7 carbon atoms which upon hydrolysis is converted to a carboxyl group directly attached to the ring carbon atom, and the other X's are hydrocarbon groups free from aliphatic unsaturation and having from 1 to 6 carbon atoms.

References Cited in the file of this patent

Alder et al.; Chemische Berichte, vol. 87 (1954), pages 1567–71. (Copy in Scientific Library.)